(12) United States Patent
Theodoras, II et al.

(10) Patent No.: US 7,471,897 B1
(45) Date of Patent: Dec. 30, 2008

(54) ELECTRICALLY LOOPED BACK, FAULT EMULATING TRANSCEIVER MODULE

(75) Inventors: James T. Theodoras, II, Plano, CA (US); Mattew L. Heston, Plano, CA (US); Clinton D. McKnight, Carrollton, TX (US)

(73) Assignee: Cisco Technology, Inc., San Jose, CA (US)

( * ) Notice: Subject to any disclaimer, the term of this patent is extended or adjusted under 35 U.S.C. 154(b) by 539 days.

(21) Appl. No.: 10/893,669

(22) Filed: Jul. 16, 2004

(51) Int. Cl.
*H04B 10/08* (2006.01)
(52) U.S. Cl. ......................... 398/22; 398/135
(58) Field of Classification Search ................ 398/22, 398/135–139; 375/221; 455/67.11
See application file for complete search history.

(56) References Cited

U.S. PATENT DOCUMENTS

| | | | |
|---|---|---|---|
| 3,809,822 A * | 5/1974 | Eddy et al. ................. | 379/193 |
| 4,759,019 A * | 7/1988 | Bentley et al. .............. | 714/703 |
| 6,454,464 B1 | 9/2002 | Nolan | |
| 6,549,310 B1 | 4/2003 | Kuchta et al. | |
| 6,735,731 B2 | 5/2004 | Ewen et al. | |
| 6,807,644 B2 | 10/2004 | Reis et al. | |
| 6,834,078 B1 | 12/2004 | Niemela et al. | |
| 6,975,706 B1 * | 12/2005 | Joffe et al. ................ | 379/22.03 |
| 7,065,038 B1 * | 6/2006 | Brandt et al. ............... | 370/219 |
| 2003/0099016 A1 | 5/2003 | Siljenberg et al. | |
| 2003/0172321 A1 * | 9/2003 | Wolin et al. .................... | 714/41 |
| 2004/0071389 A1 * | 4/2004 | Hofmeister et al. ........... | 385/16 |
| 2004/0073849 A1 | 4/2004 | Wong et al. | |
| 2004/0203443 A1 | 10/2004 | Woolf et al. | |
| 2007/0031153 A1 * | 2/2007 | Aronson et al. ............. | 398/138 |

* cited by examiner

*Primary Examiner*—Leslie Pascal
(74) *Attorney, Agent, or Firm*—Cindy Kaplan

(57) ABSTRACT

A transceiver module having transmit data lines looped back to receive data lines that emulates faults without requiring optical subassemblies inside the module or optical test equipment external to the module. That data lines can be buffered for transparent probing of signals. One or more values directing emulation of a fault are received, such as over a two wire serial interface, and the fault is emulated. The values can be values for electronic pins of the transceiver module, values for operation status of the transceiver module or values for characteristics of signals within the transceiver module.

38 Claims, 4 Drawing Sheets

ELECTRICALLY LOOPED BACK, FAULT EMULATING TRANSCEIVER MODULE

BACKGROUND OF THE INVENTION

The present invention relates to transceiver modules. More specifically, the invention relates to transceiver modules with electrically looped back signals that can emulate faults of optical transceiver modules.

Currently, optical network devices are present in most all high speed networks. The industry is continually improving on the bandwidth and features of these network devices. One of the largest expenses in releasing new optical devices relates to testing the devices during the many different stages of development, such as software verification testing, hardware verification testing and manufacturing testing.

FIG. 1 shows many conventional ways of testing optical network devices. An optical network device (or system) 1 can include one or more linecards 3. The line cards are typically inserted into connectors and are connected electrically through a backbone to other hardware (and software) within optical network device 1.

Optical transceivers 5 are connected to linecards 3 and convert optical signals to electrical signals, and vice versa. Many conventional optical transceivers conform to the "small form-factor pluggable" (SFP) standard. SFP transceivers are designed to be high bandwidth, small physical size and easily changeable (including being hot-swappable) on the line card of the network device.

As shown in FIG. 1, optical loopbacks can be utilized for testing. In this instance, a transmit optical fiber can be looped back to also serve as the receive optical fiber. Also, the optical signal can be attenuated (such as by a computer controlled attenuator or shutter) for testing purposes. Additionally, an optical fiber can be manually pulled. Lastly, test equipment 7 can be utilized through an optical transceiver module.

Each of the solutions shown in FIG. 1 typically requires every optical port on the line card to be filled with an optical transceiver. This can result in one of the largest expenses in releasing new optical network products as the optical transceivers are expensive.

Furthermore, many of the solutions provide further disadvantages. For example, a computer controlled attenuator can be expensive and bulky, which can be problematic since it has to be moved from port to port. Manually pulling the optical fiber is a slow process and wears out the optics. Lastly, the constant plugging and unplugging of shared optics that are moved from one port to another wears out the plugs (e.g., they may only be rated for 50 cycles).

Electrically looped back optical transceivers have been produced to attempt to address some of the shortcomings of conventional testing methods. However, the results of these solutions have not been satisfactory in many situations.

It would be beneficial to have innovative techniques for providing electrically looped back transceiver modules that provides flexibility in testing while savings costs. Additionally, it would be beneficial if the transceiver module can be instructed to emulate faults.

SUMMARY OF THE INVENTION

The present invention provides innovative techniques for electrically looped back transceiver modules (also called fault modules). In general, an optical transceiver module has the transmit and receive data lines looped back, therefore eliminating the requirement for expensive optical components. The electrical signals can be electrically terminated, buffered and regenerated as well. The optical transceiver can also be instructed (e.g., via a two wire serial interface) through one or more values to emulate various specific faults.

Advantages include that faults can be emulated much more efficiently than conventional techniques such as utilizing attenuators or manually pulling optical fibers. Jitter testing can also be provided in embodiments to isolate contributions from the line card and optics. Furthermore, the line cards and optical modules can be tested separately. There can be a significant reduction in costs as the transceiver module does not require expensive optical components.

This cost reduction can allow the transceiver modules of the invention to be present in line cards or network devices throughout all stages of development (e.g., every stage from early design to final testing). Also, the transceiver modules can be utilized to fill every unused optical port. This can allow customers to inexpensively monitor unused ports to verify if the port is good before an optical module is inserted and traffic is switched to it. Some specific embodiments of the invention are described below.

In one embodiment, the invention provides a method of emulating faults in a transceiver module. Transmit data lines are electrically looped to receive data lines. One or more values are received and the one or more values are utilized to emulate a fault in the transceiver module.

In another embodiment, the invention provides a transceiver module that emulates faults. Transmit data lines are electrically looped back to receive data lines. A processor receives one or more values and utilizes the one or more values to emulate a fault in the transceiver module.

In another embodiment, the invention provides a method of emulating faults in a network device. A line card sends one or more values directing emulation of a fault. Transmit data lines are electrically looped back to receive data lines in a transceiver module. The transceiver module receives the one or more values and utilizes the one or more values to emulate a fault.

In another embodiment, the invention provides a network device that emulates faults. A line card sends one or more values directing emulation of a fault. A transceiver module having transmit data lines electrically looped back to receive data lines receives the one or more values and utilizes the one or more values to emulate a fault.

Other features and advantages of the invention will become readily apparent upon review of the following description in association with the accompanying drawings, where the same or similar structures are designated with the same reference numerals.

DETAILED DESCRIPTION OF EMBODIMENTS

In the description that follows, the present invention will be described in reference to embodiments that are used in association with transceiver modules for testing at ports of line cards of network devices. However, embodiments of the invention are not limited to any particular version, protocol, environment, application, or implementation. For example, although embodiments of the invention will be described in reference to specific embodiments, the invention can be advantageously applied to many embodiments. Therefore, the description of the embodiments that follows is for purposes of illustration and not limitation.

Figure 1:
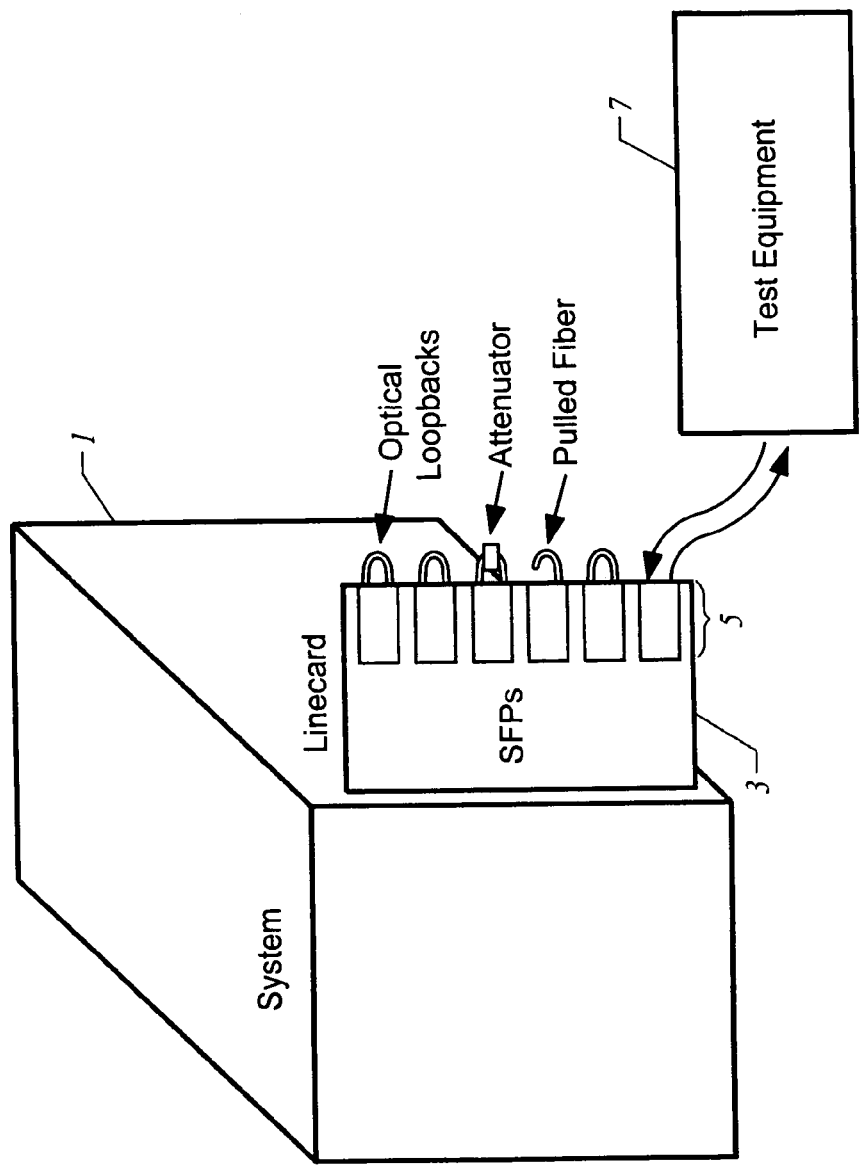
FIG. 1 shows conventional testing techniques that are utilized for optical network devices.
Figure 2:
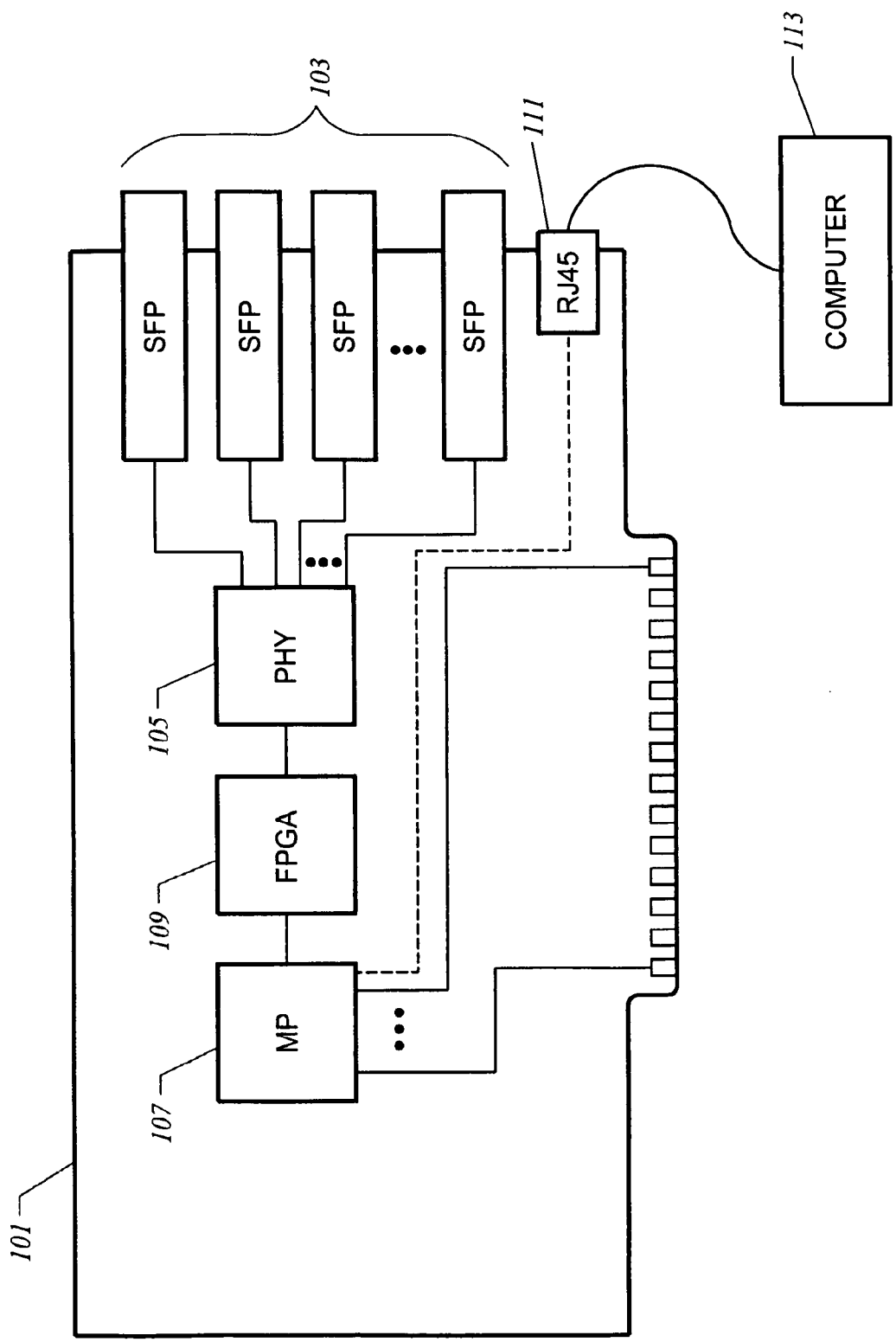
FIG. 2 illustrates an example of line card including multiple optical transceiver modules and a connection that can be utilized for testing through a computer.

Network devices typically incorporate multiple slots for inserting various line cards. FIG. 2 illustrates an example of line card including multiple transceiver modules that can be present in a network device. Line card 101 includes a number of ports that can accept transceiver modules (labeled "SFPs," but any format can be utilized) 103. Typically, optical transceiver modules are inserted in the ports, but other transceiver modules including those incorporating embodiments of the invention can also be inserted in the ports as will be described in more detail below.

PHY 105 is an integrated circuit that is utilized to interface between transceiver modules 103 and a processor (or microprocessor) 107 on the line card. Processor 107 typically includes memory and is directed by a software application.

A field programmable gate array (FPGA) 309 can be utilized to provide communication between processor 107 and the multiple ports to which the transceiver modules 103 are inserted.

A network connection (labeled "RJ45") 111 is shown on line card 101 to allow communication with the line card. For example, as shown, a computer 113 can communicate with line card 101 through network connection to direct and monitor testing of the line card.

Figure 3:
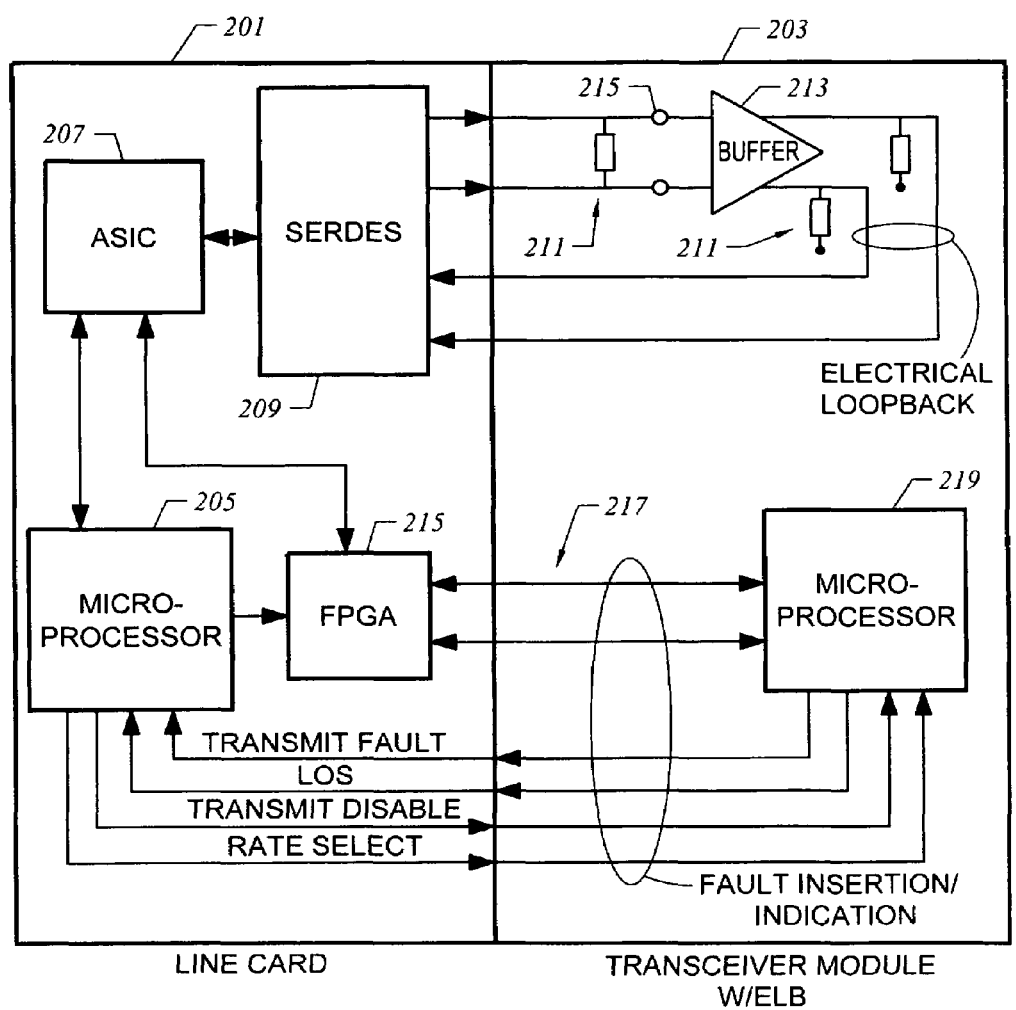
FIG. 3 shows a block diagram of a line card in communication with an embodiment of the invention that is a transceiver module with electrical loop back (ELB) and the capability to emulate faults.

Now it may be beneficial to describe one embodiment with detail to the interaction of the line card and the transceiver module. FIG. 3 shows a block diagram of a line card in communication with a transceiver module with electrical loop back (ELB) and the capability to emulate faults.

A line card 201 electrically communicates with transceiver module 203. A microprocessor 205 is connected to an application specific integrated circuit (ASIC) 207, which is connected to a serial/deserializer (SERDES) 209. The electrical signals from SERDES 209 are typically converted to optical signals in an optical transceiver module, which are then transmitted over optical fibers. Other embodiments for the line card can include a PHY or ASIC macro on the line card so the invention is not limited to any specific implementation.

With an embodiment of the invention, the electric signals carrying transmit data for the optical fibers from line card 201 are electrically looped back, meaning that the transmit data lines from the line card are routed in a loop to become the receive data lines coming back to the line card as shown. The data lines are electrically terminated as shown by arrows 211 and a buffer 213 buffers the signals (e.g., for transparent probing of signals). Thus, signals on the data lines are electrically terminated, buffered and regenerated.

In some embodiments, jitter control points 215 allow testing to determine contributions of the line card and optics. The line cards and optical transceiver modules can be tested separately.

In an SFP, there are four pins corresponding to transmit fault, loss of signal (LOS), transmit disable, and rate select. The transmit fault pin carries a signal back to the line card that there is a transmit fault. The LOS pin carries a signal back to the line card that there was a loss of signal. The transmit disable pin carries a signal to the SFP that transmissions should be disabled. Lastly, the rate select pin carries a signal specifying a transmission rate.

Embodiments of the invention can direct transceiver module 203 to emulate one or more faults. This is accomplished by sending one or more values to the transceiver module. The values can be values for electronic pins of the transceiver module, values for operational status of the transceiver module or values for characteristics within the transceiver module as will be described below.

System (or diagnostic) software operating on the microprocessor 205 send these values through a field programmable gate array (FPGA). Although FPGA 215 is not present in some embodiments (and other embodiments can use other electrical components), the FPGA can assist microprocessor 205 in communicating with transceiver module 203.

FPGA communicates over a two wire serial interface 217 to a microprocessor 219 on transceiver module 203. For example, the one or more values specifying a fault to be emulated travel over two wire serial interface 217. Microprocessor 219 operates fault emulation software on the transceiver module. Although a two wire serial interface is shown, other interfaces may be utilized in other embodiments.

The values that are sent to transceiver module 203 to direct emulation of a fault will depend on the module technology (e.g., SFP) and implementation. The embodiment shown is an SFP, but it should be understood that the invention can be advantageously applied to other module technologies.

As mentioned above, pins on the SFP carry signals between the line card and transceiver module. Values can be sent to set these values within the transceiver module to emulate faults. For example, a signal can be sent over two wire serial interface 217 that specifies the LOS pin should carry a signal back to line card 201 that indicates there is a loss of signal. The system software operating on the line card can then monitor if the fault information is correctly received. Thus, the values directing fault emulation can be values for electronic pins of the transceiver module.

For all the electronic pins, it can be beneficial to store in memory the value of the signal on the pin. For pins that carry signals that are sent to the transceiver module, an additional value can be stored for software overriding of the value on the pin. For example, the rate select pin carries a signal to transceiver module 203 specifying a transmission rate. The signal on the pin can be stored in memory, however, an additional value can be stored if the software desires to override the value on the pin to emulate a fault. Thus, these values can relate to the operational status of the transceiver module. Other values relating to the operation status of the transceiver module can be alarms relating to if the transmit power is too high, the receive power is too low, and the like.

The values directing emulation of a fault can also specify characteristics within the transceiver module. For example, values for the laser bias, transmit power and receive power can be stored in transceiver module 203. In order to emulate faults, values for any one or more of these characteristics can be sent to the transceiver module. The fault emulation software on the transceiver module emulates the fault and the system software on the line card monitors the results.

The fault emulation software can also change values within transceiver module 203 as desired. For example, if the transceiver module receives a value that the transmit disable should be considered as specified as being disabled (i.e., regardless of the signal on the transmit disable pin, the transceiver module should operate as if transmit is disabled). The fault emulation software may then zero out stored values for laser bias, transmit power and receive power. In a similar manner, signals that are actually received on pins of the transceiver module (e.g., transmit disable pin and rate select pin) can also have an affect on other values stored within the transceiver module.

Figure 4:
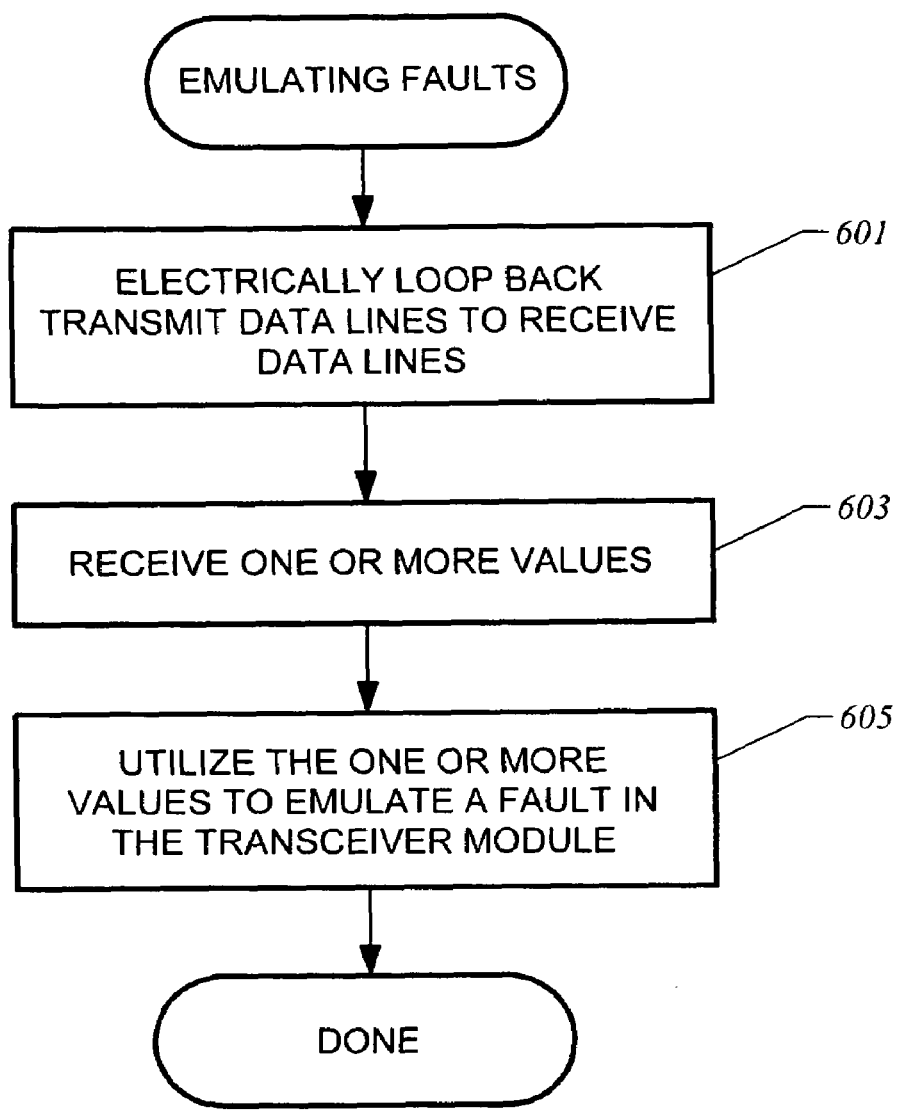
FIG. 4 shows a flowchart of a process of emulating faults by receiving one or more values directing the emulation of the fault by the transceiver module.

FIG. 4 shows a flowchart of a process of emulating faults by receiving one or more values directing the emulation of the fault by the transceiver module. The flow shown is typically performed on the transceiver module. Steps can be added, deleted, combined, and reordered with departing from the spirit and scope of the invention. For example, steps can be added that are performed by system software on the line card or an external source (e.g., a computer networked to the line card as shown in FIG. 2).

At a step 601, transmit data lines are electrically looped back to receive data lines. By electrically looping back the data lines, expensive optics are not required, which can drastically reduce the cost and complexity of the transceiver module. In some embodiments, the signals on the data lines are buffered to aid in testing. Additionally, jitter monitor points on the data lines can also be provided.

One or more values are received at a step 603. Typically, these values are sent by system software operating on the line card, but can originate from other sources. The values direct emulation of one or more faults by the transceiver module. As described above, the values can be values for electronic pins of the transceiver module, values for operational status of the transceiver module or values for characteristics within the transceiver module. Other values can also be utilized in other embodiments.

At a step 605, the one or more values are utilized to emulate a fault in the transceiver module. The fault can be emulated by fault emulation software operating on the transceiver module. System software operating on the line card can monitor the signals received from the transceiver module to verify if the port is in good working condition.

Embodiments of the invention can emulate faults much more efficiently than conventional techniques such as utilizing attenuators or manually pulling optical fibers. There can be a significant reduction in costs as the fault modules do not require expensive optical subassemblies. For example, Transmitter Optical SubAssemblies (TOSAs) and Receiver Optical SubAssemblies (ROSAs) can account for over 90% of the cost of an optical module. This cost reduction can allow the transceivers of the invention to be present in line cards or network devices throughout all stages of development. Also, the transceivers can be utilized to fill every unused optical port. This allows customers to inexpensively monitor unused ports to verify if the port is good before an optical module is inserted and traffic is switch to it.

While the above is a complete description of preferred embodiments of the invention, various alternatives, modifications, and equivalents can be used. It should be evident that the invention is equally applicable by making appropriate modifications to the embodiments described above. For example, although the invention has been described in relation to specific embodiments, the invention can be advantageously applied to other embodiments. Therefore, the above description should not be taken as limiting the scope of the invention as defined by the metes and bounds of the appended claims along with their full scope of equivalents

The invention claimed is:

1. A method of emulating faults in a transceiver module, comprising:
   electrically looping back transmit data lines to receive data lines at the transceiver module;
   receiving at the receive data lines of the transceiver module, one or more values from a line card, the values directing emulation of a fault at the transceiver module; and
   utilizing the one or more values to emulate a fault in the transceiver module.

2. The method of claim 1, further comprising buffering signals on the data lines.

3. The method of claim 1, further comprising electrically regenerating the signals on the data line.

4. The method of claim 1, further comprising providing jitter monitor points on the data lines.

5. The method of claim 1, wherein the one or more values are received over a two wire serial interface.

6. The method of claim 1, wherein the one or more values received at the transceiver module from the line card are values for electronic pins of the transceiver module, values for operational status of the transceiver module or values for characteristics of signals within the transceiver module.

7. The method of claim 6, wherein values for electronic pins of the transceiver module are transmit fault pin, transmit disable pin, loss of signal pin or rate select pin.

8. The method of claim 6, wherein values for operational status of the transceiver module are transmit fault, rate select, alarm for transmit power, or alarm for receive power.

9. The method of claim 6, wherein values for characteristics of signals within the transceiver module are transmit power or receive power.

10. A transceiver module that emulates faults, comprising:
    transmit data lines electrically looped back to receive data lines at the transceiver module; and
    a processor that receives one or more values from a line card and utilizes the one or more values to emulate a fault in the transceiver module, the values directing emulation of a fault at the transceiver module;
    wherein the receive data lines receive the one or more values utilized by the processor.

11. The transceiver module of claim 10, further comprising a buffer on the data lines.

12. The transceiver module of claim 10, wherein the signals on the data lines are electrically regenerated.

13. The transceiver module of claim 10, further comprising jitter monitor points on the data lines.

14. The transceiver module of claim 10, further comprising a two wire serial interface that receives the one or more values.

15. The transceiver module of claim 10, wherein the one or more values are values for electronic pins of the transceiver module, values for operational status of the transceiver module or values for characteristics of signals within the transceiver module.

16. The transceiver module of claim 15, wherein values for electronic pins of the transceiver module are transmit fault pin, transmit disable pin, loss of signal pin or rate select pin.

17. The transceiver module of claim 15, wherein values for operational status of the transceiver module are transmit fault, rate select, alarm for transmit power, or alarm for receive power.

18. The transceiver module of claim 15, wherein values for characteristics of signals within the transceiver module are transmit power or receive power.

19. A transceiver module that emulate faults, comprising:
    means for electrically looping back transmit data lines to receive data lines at the transceiver module;
    means for receiving at the receive data lines of the transceiver module, one or more values from a line card, the values directing emulation of a fault; and means for utilizing the one or more values at the transceiver module to emulate a fault in the transceiver module.

20. A method of emulating faults in a network device, comprising:

a line card sending one or more values directing emulation of a fault;

electrically looping back transmit data lines to receive data lines in a transceiver module; and the transceiver module receiving at the receive data lines the one or more values and utilizing the one or more values to emulate a fault.

21. The method of claim 20, further comprising buffering signals on the data lines.

22. The method of claim 20, further comprising electrically regenerating the signals on the data lines.

23. The method of claim 20, further comprising providing jitter monitor points on the data lines.

24. The method of claim 20, wherein the one or more values are received over a two wire serial interface.

25. The method of claim 20, wherein the one or more values are values for electronic pins of the transceiver module, values for operational status of the transceiver module or values for characteristics of signals within the transceiver module.

26. The method of claim 25, wherein values for electronic pins of the transceiver module are transmit fault pin, transmit disable pin, loss of signal pin or rate select pin.

27. The method of claim 25, wherein values for operational status of the transceiver module are transmit fault, rate select, alarm for transmit power, or alarm for receive power.

28. The method of claim 25, wherein values for characteristics of signals within the transceiver module are transmit power or receive power.

29. A network device that emulates faults, comprising:

a line card that sends one or more values directing emulation of a fault; and a transceiver module having transmit data lines electrically looped back to receive data lines that receives the one or more values and utilizes the one or more values to emulate a fault.

30. The network device of claim 29, further comprising a buffer on the data lines.

31. The network device of claim 29, wherein the signals on the data lines electrically regenerated.

32. The network device of claim 29, further comprising jitter monitor points on the data lines.

33. The network device of claim 29, further comprising a two wire serial interface that receives the one or more values.

34. The network device of claim 29, wherein the one or more values are values for electronic pins of the transceiver module, values for operational status of the transceiver module or values for characteristics of signals within the transceiver module.

35. The network device of claim 34, wherein values for electronic pins of the transceiver module are transmit fault pin, transmit disable pin, loss of signal pin or rate select pin.

36. The network device of claim 34, wherein values for operational status of the transceiver module are transmit fault, rate select, alarm for transmit power, or alarm for receive power.

37. The network device of claim 34, wherein values for characteristics of signals within the transceiver module are transmit power or receive power.

38. A method of emulating faults in a network device, comprising:

a means for sending one or more values directing emulation of a fault;

a means for electrically looping back transmit data lines to receive data lines in a transceiver module; and a means for receiving at the receive data lines the one or more values and utilizing the one or more values to emulate a fault.

* * * * *